United States Patent
Jiwan et al.

(10) Patent No.: US 9,085,435 B2
(45) Date of Patent: Jul. 21, 2015

(54) DEVICE FOR STACKING SHEETS OF PAPER OR SIMILAR

(75) Inventors: Christian Jiwan, Turckheim (FR); Pascal Leissier, Lutterbach (FR); Frederic Eitel, Westhalten (FR)

(73) Assignee: Kern A.G., Konolfingen (CH)

(*) Notice: Subject to any disclaimer, the term of this patent is extended or adjusted under 35 U.S.C. 154(b) by 0 days.

(21) Appl. No.: 14/113,591

(22) PCT Filed: Apr. 27, 2012

(86) PCT No.: PCT/FR2012/000168
§ 371 (c)(1),
(2), (4) Date: Oct. 24, 2013

(87) PCT Pub. No.: WO2012/150386
PCT Pub. Date: Nov. 8, 2012

(65) Prior Publication Data
US 2014/0048999 A1 Feb. 20, 2014

(30) Foreign Application Priority Data
May 2, 2011 (FR) ...................... 11 53734

(51) Int. Cl.
| | |
|---|---|
| B65H 35/00 | (2006.01) |
| B41F 13/64 | (2006.01) |
| B65G 21/22 | (2006.01) |
| B65G 21/14 | (2006.01) |
| B65G 17/16 | (2006.01) |
| B65G 15/26 | (2006.01) |
| B65G 17/28 | (2006.01) |
| B65G 41/00 | (2006.01) |
| B65H 29/50 | (2006.01) |
| B65H 31/30 | (2006.01) |

(52) U.S. Cl.
CPC ............... *B65H 35/00* (2013.01); *B41F 13/64* (2013.01); *B65G 15/26* (2013.01); *B65G 17/16* (2013.01);
(Continued)

(58) Field of Classification Search
CPC ........ B41F 13/64; B65H 29/50; B65G 21/22; B65G 21/14; B65G 17/16; B65G 17/28; B65G 15/26; B65G 41/002
USPC ............ 198/457.03, 578, 588, 589, 592, 594, 198/812, 809, 861.2, 861.3, 861.5; 271/200, 201
See application file for complete search history.

(56) References Cited

U.S. PATENT DOCUMENTS

| | | | |
|---|---|---|---|
| 2,660,432 | A | 11/1953 | Wilske et al. |
| 3,419,266 | A | 12/1968 | Martin |

(Continued)

FOREIGN PATENT DOCUMENTS

| | | |
|---|---|---|
| FR | 1 402 034 | 6/1965 |
| FR | 2 480 726 | 10/1981 |

(Continued)

OTHER PUBLICATIONS

International Search Report Corresponding to PCT/FR2012/000168 mailed Aug. 29, 2012.

*Primary Examiner* — Leslie A Nicholson, III
(74) *Attorney, Agent, or Firm* — Davis & Bujold, P.L.L.C.; Michael J. Bujold (57) ABSTRACT

The device (10) for stacking sheets (40) arranged to form stacks (4) downstream of a sheet cutting line and comprises an unroller, a printer and a cutter (6). The device has a stacking table (20) located in the same plane as an evacuation conveyor (5) and the device includes an unloading conveyor (7) with first and second ends (70, 71). The unloading conveyor (7) is arranged to transfer the cut sheets (40), one by one, from the cutter outfeed conveyor (3) towards the stacking table (20) and is coupled with driving mechanism arranged to move the second end (71) between a low position in which the second end (71) is located at the level of the stacking table (20), and a high position in which the second end (71) is located at a height corresponding to that of the complete stack (4).

15 Claims, 5 Drawing Sheets

(52) U.S. Cl.
CPC ............... *B65G 17/28* (2013.01); *B65G 21/14* (2013.01); *B65G 21/22* (2013.01); *B65G 41/002* (2013.01); *B65H 29/50* (2013.01); *B65H 31/3054* (2013.01); *B65H 2301/15* (2013.01); *B65H 2301/42172* (2013.01); *B65H 2403/46* (2013.01); *B65H 2404/2693* (2013.01)

(56) References Cited

U.S. PATENT DOCUMENTS

| | | | | |
|---|---|---|---|---|
| 5,439,209 A | * | 8/1995 | Runzi | 271/251 |
| 5,520,577 A | * | 5/1996 | Rasmussen | 453/56 |
| 5,904,465 A | * | 5/1999 | Villacieros Fernandez | 414/794.5 |
| 5,961,115 A | * | 10/1999 | Blanck et al. | 271/263 |
| 5,980,196 A | * | 11/1999 | Roth | 414/790.8 |
| 6,234,473 B1 | * | 5/2001 | Morgan et al. | 271/201 |
| 6,347,260 B1 | * | 2/2002 | Graushar et al. | 700/223 |

FOREIGN PATENT DOCUMENTS

| | | |
|---|---|---|
| JP | 48-027453 A | 4/1973 |
| JP | S56-141260 A | 11/1981 |
| JP | H08-217308 A | 8/1996 |
| JP | H09-86768 A | 3/1997 |
| WO | 99/00305 A1 | 1/1999 |

* cited by examiner

DEVICE FOR STACKING SHEETS OF PAPER OR SIMILAR

This application is a National Stage completion of PCT/FR2012/000168 filed Apr. 27, 2012, which claims priority from French patent application serial no. 11/53737 filed May 2, 2011.

FIELD OF THE INVENTION

The present invention relates to a device for stacking sheets of paper or similar, arranged to form stacks downstream of a sheet cutting line including in particular an unroller, a printer and a cutter, said stacking device including a cutter outfeed conveyor arranged to bring the sheets cut by the cutter one by one towards a stacking table arranged to communicate with a stack evacuation conveyor located below the cutter outfeed conveyor so that, once it is formed, at least one complete stack of sheets can be transferred from said stacking table to said stack evacuation conveyor, said stacking table being fixed and located in the same plane as said stack evacuation conveyor and said stacking device including an unloading conveyor comprising a first end and a second end that communicate respectively with said cutting outfeed conveyor and said stacking table, said unloading conveyor being arranged to transfer said cut sheets one by one from said cutter outfeed conveyor towards said stacking table and being coupled with driving means (driver) arranged to move said second end between a low position in which, when the first sheet of a stack is conveyed, said second end is located at the level of the stacking table, and a high position in which, when the last sheet of the stack is conveyed, said second end is located at a height corresponding to that of the complete stack.

BACKGROUND OF THE INVENTION

Figures 1, 2:
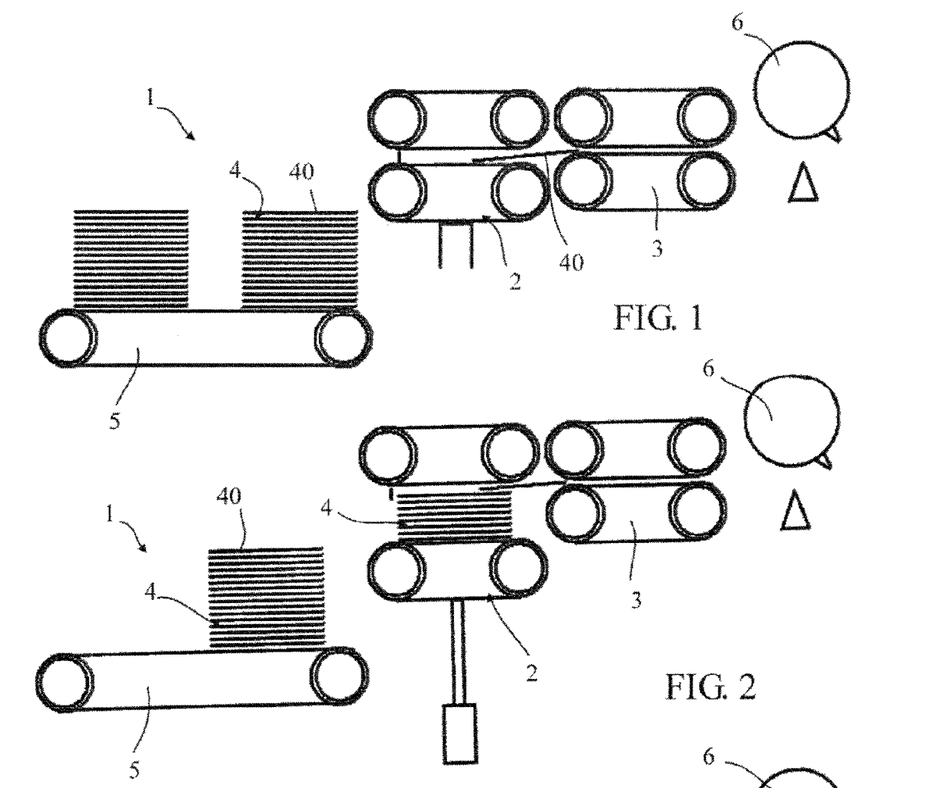
FIGS. 1 to 3 represent schematic profile views of a device for stacking sheets according to the prior art, respectively at the beginning of a sheet stacking cycle, during the forming of the stack and when a complete stack of sheets has been formed.
Figure 3:
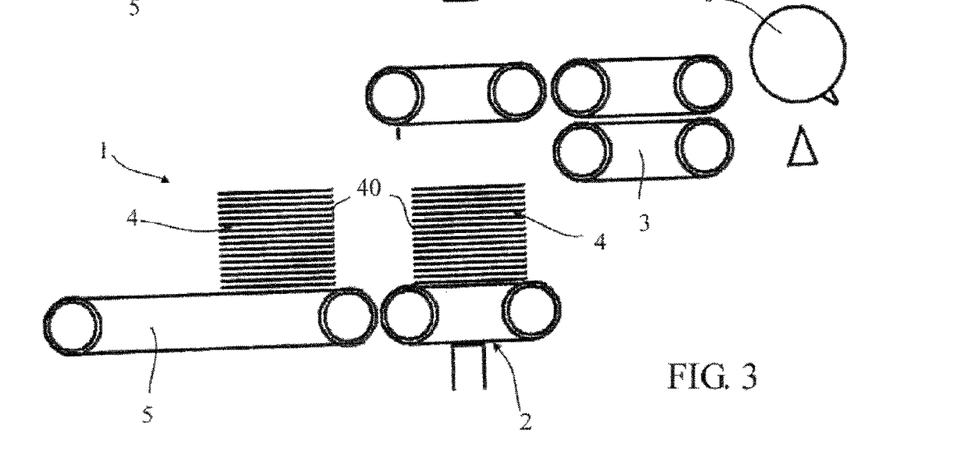

In the considered technical scope, that is to say the high-speed processing of paper sheets, the closest prior art is represented by a stacking device 1 illustrated in FIGS. 1 to 3. Such stacking device 1 comprises classically a stacking table 2 that is movable in vertical translation between at least one position in which it is empty and located substantially in the same plane as the cutter outfeed conveyor 3 (FIG. 1) and at least one other position in which it is loaded with a stack 4 of sheets and located in the same plane as the sheet stacks 4 evacuation conveyor 5. Consequently, when a stack of sheets 4 is being formed (FIG. 2), the sheets accumulate progressively on the stacking table 2, whose level moves downwards as the sheets accumulate and the stack 4 is formed, up to reach the plane of the evacuation conveyor 5 on which they are then transferred (FIG. 3).

Such a configuration implies that the stacking table 2, which has to bear at least temporarily the whole weight of the sheets stack 4 has to have a more heavy and rigid structure the higher the sheet stacks 4 will be. The vertical movement of such stacking table 2 consequently implies powerful and fast actuators that are not only expansive, but also require regular maintenance.

On the other hand, once the complete sheets stack has been formed, the stacking table 2 must perform, in addition to a vertical downwards movement to reach the plane of the evacuation conveyor, also an upwards movement to reach again that of the cutter outfeed conveyor 3 and start a new sheets stacking cycle. During this period of time, which varies according to the final height of the sheets stack 4, the cutter 6 has imperatively to be stopped, leading to a significant slowdown of the production rates of such a stacking device 1, which is not compatible with the rates of the high-speed printers currently used in most of the document processing units concerned by the invention.

Publication FR 2 480 726 describes a device for stacking cardboard blanks in which the stacking table is fixed and the outfeed conveyor is movable and comprises a first upstream end used as a joint for the conveyor and a second downstream end that communicates with the fixed stacking table and moves upwards as the cardboard blanks are stacked, imposing a variation in the length of the outfeed conveyor. To allow this length variation, the outfeed conveyor is equipped with a tensioning device that has the goal of compensating for the length differences between the ends of said conveyor. On the other hand, the stack forms freely, since the stacking table has no guiding and positioning device for the cardboard blanks. Therefore this technology is limited to low speeds and to stacking of materials such as cardboard, which is by definition rigid and heavier than paper. It is not transposable to the processing of paper sheets, which are by definition thin, flexible and light, nor to a high-speed or even very high-speed processing, since it comprises no device that would allow controlling the individual trajectory of the sheets or obtaining properly formed sheet stacks with perfectly aligned edges. This same type of technology is also described in publications FR 1 402 034, JP 8 217308, JP 48 027453, U.S. Pat. No. 3,419,266 and U.S. Pat. No. 2,660,432. But no existing solution responds to the problem set.

Moreover, if the format of the paper sheets to be processed is too large and does not allow stacking them in stacks, the paper sheet have to be stacked in a stepped or in a fish-scale-like manner, which means that they are placed over each other, overlapping partially, on a stacking table provided with a conveyor moving at low speed. It is thus economically interesting to have the possibility of modifying a sheet stacking machine to switch from a "stack stacking" mode to a "stepped stacking" mode. Yet, in the stacking device according to the prior art represented in FIGS. 1 to 3, this modification requires either to remove the stacking table to replace it with a stacking conveyor positioned at the outlet of the cutter, or to provide a "bypass" system to short-circuit the stacking table and to shift the outlet conveyor to the level of the cutter. Switching to the "stepped stacking" mode consequently requires the addition of complementary mechanical elements and machines including motors, belts, detection cells, etc., which form expansive sets and require significant intervention time.

In the cardboard blanks stacking devices described above, this transformation into the "stepped stacking" mode is not possible, since none of the described devices comprises guiding means that would hold the sheets at the stacking table level.

SUMMARY OF THE INVENTION

The present invention aims solve this problem by offering a device for stacking sheets of paper or similar comprising a light and simplified structure, whose cost and maintenance operations frequency are greatly limited. Another scope of the invention is to offer a device for stacking sheets in which the stacking table can be fed almost permanently, so that the downtimes of the cutter are considerably reduced and the productivity of the printer is maintained. Yet another scope of the invention is to be able to switch from a "stack stacking" mode to a "stepped stacking" mode quickly and at a lower cost, allowing to process larger paper formats on the same machine.

To that purpose, the invention relates to a stacking device of the type stated in the preamble, characterized in that said first end and said second end of said unloading conveyor are mounted each on at least one supporting structure, said supporting structure of the first end being assembled with said second supporting structure of the second end by a sliding connection parallel to the plane of said unloading conveyor.

According to a preferential embodiment, said first end is articulated about a fixed horizontal axis, parallel to said stacking table, while said second end is movable in vertical translation between said low and high positions of said unloading conveyor, said unloading conveyor being arranged so that the distance between said fixed axis and said second movable end varies as said second end moves vertically, thanks to the relative sliding displacement of said two supporting structures of the unloading conveyor.

Moreover, according to an additional characteristic, said driving means (driver) includes at least one actuator coupled by means of a mechanical transmission with a mobile carriage connected to said second end of said unloading conveyor.

In compliance with an embodiment variant of the invention, the mechanical transmission can include at least one vertical endless screw guided in rotation in a fixed frame and engaging said mobile carriage along said endless screw. According to another embodiment variant, the mechanical transmission can include at least pulleys engaging a belt coupled with said mobile carriage, which is guided vertically in a fixed frame.

Moreover, the device according to the invention is also characterized in that said mobile carriage is coupled with a guiding element comprising translation stopper means that allow forming homogeneous sheet stacks, this guiding element can furthermore include a conveyor to bring the cut sheet up to the stop, as well as means for adjusting its depth in function of the format of the stacked sheets.

Furthermore, the stacking device according to the invention advantageously includes means for detecting the formation of a complete stack, such as means for counting the number of sheets, or means for reading optical marks printed on said sheet.

According to another characteristic of the invention, the supporting structures of said unloading conveyor include at least one belt topped by a plurality of aligned rollers.

Moreover, in compliance with the invention, said unloading conveyor has advantageously a length allowing him to transport simultaneously several sheets intended to be conveyed one after the other to form a same stack or several successive stacks.

Likewise, according to another advantageous embodiment of the invention, the unloading conveyor has a width allowing him to transport simultaneously several sheets intended to be conveyed simultaneously beside each other to form simultaneously several stacks.

Moreover, the stacking device according to the invention can be advantageously completed with a transformation kit to switch over to the "stepped stacking" mode including at least one idle wheel mounted on an arm articulated about the free end of said guiding element so that said wheel is in elastic contact with the conveyor of the stacking table and forms a vertically movable stop.

BRIEF DESCRIPTION OF THE DRAWINGS

The present invention and its advantages will be better revealed in the following description of an embodiment given as a non limiting example, in reference to the drawings in appendix, in which.

DETAILED DESCRIPTION OF THE PREFERRED EMBODIMENTS

Figure 4:
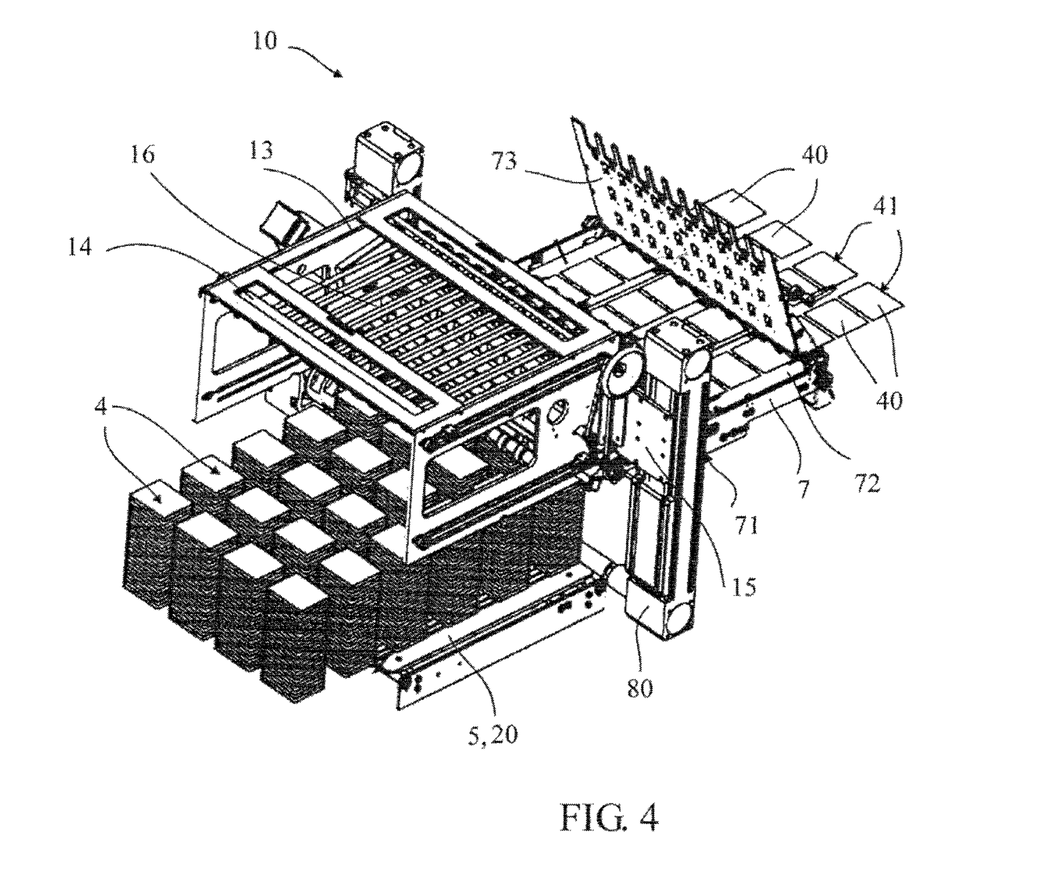
FIG. 4 is a perspective view of a stacking device according to the invention.

Referring to FIGS. 4 to 10, the invention relates to a device 10 for stacking sheets of paper or similar, arranged to form sheet stacks 4 downstream of a sheet cutting line including in particular an unroller, a printer (both not represented) and a cutter 6. In the embodiment variant represented in FIG. 4, such a stacking device 10 is advantageously arranged to form simultaneously four sheet stacks 4 from four parallel rows 41 of individual sheet 40, each stack 4 being obtained by superposition of the sheet 40 of a same row 41. Classically, the sheets 40 have previously been cut from several strips of paper or similar (not represented) using a cutter 6 (see FIGS. 5 to 7) and are transported towards a stacking table 20 by a cutter outfeed conveyor 3 (see FIGS. 5 to 7) having a suitable width for transporting the four rows 41. Of course, FIG. 4 is only an example of an embodiment, and the stacking device 10 can allow forming from one to X sheet stacks 4.

Figures 5, 6:
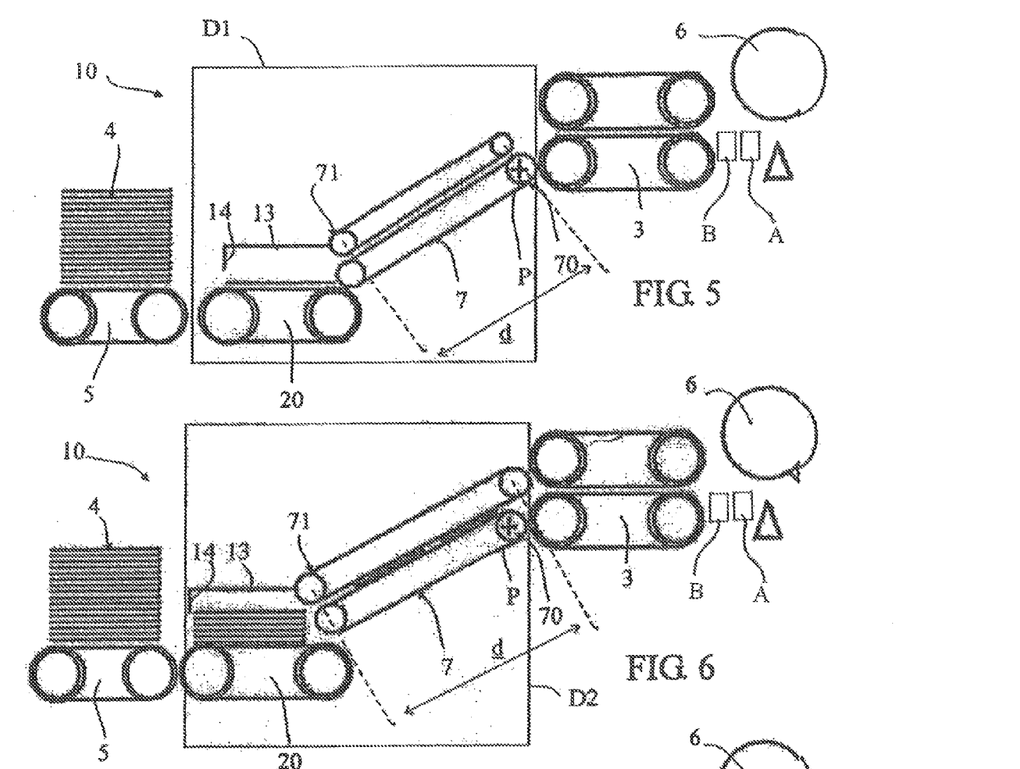
FIGS. 5 to 7 represent schematic partial profile views of the stacking device &FIG. 4 respectively at the beginning of a sheet stacking cycle, during the forming of the stack and when a complete stack of sheets has been formed.
Figure 7:
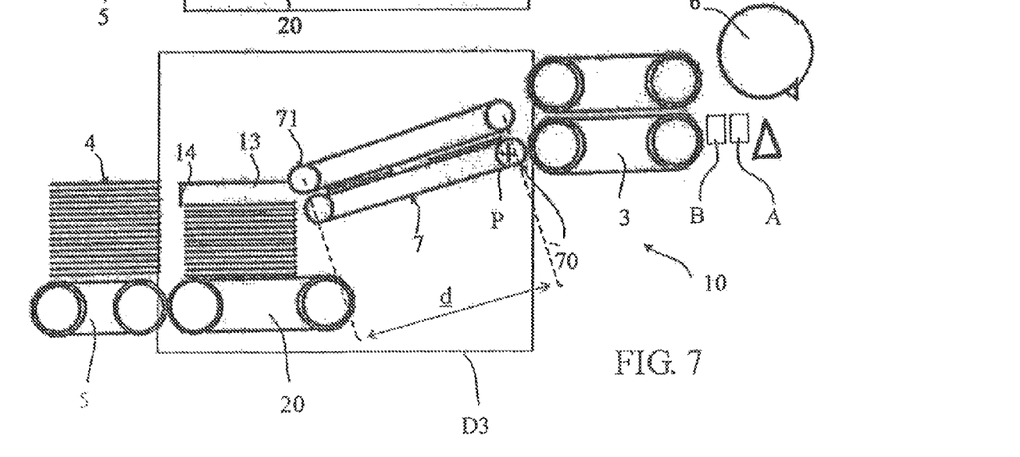

In compliance with the invention, the stacking table 20 is fixed and located in the same plane as the stack evacuation conveyor 5 (see FIGS. 5 to 7). This stacking table 20 can also be merged with the stack evacuation conveyor 5 (see FIG. 4). Moreover, it communicates with the cutter outfeed conveyor 3 through an unloading conveyor 7 arranged to transfer progressively the sheet 40 of paper or similar towards the stacking table 20 located below.

To that purpose, the unloading conveyor 7 comprises one or several parallel belts 72 topped by a plurality of guide rollers 73 arranged in parallel lines (see FIGS. 4 and 8 to 10). It has a width suitable for that of the stacking table 20 in order to transport simultaneously a number X of parallel sheet rows 41 corresponding to the number X of stacks 4 to be formed. Furthermore, its first end 70, which corresponds to the upper end and communicates with the cutter outfeed conveyor 3, is articulated about a fixed horizontal axis P parallel to the stacking table 20, while its second end 71, which corresponds to the lower end and communicates with the stacking table 20, is movable in vertical translation between a low position in which it is located at the level of the plane of the stacking table 20, and a high position in which it is located at the height of a complete sheet stack 4.

Figure 8:
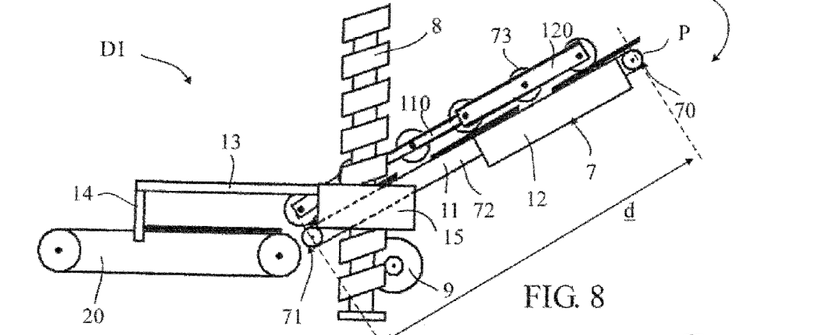
FIGS. 8 to 10 represent respectively detailed views of sections D1, D2 and D3 of FIGS. 5, 6 and 7.
Figure 9:
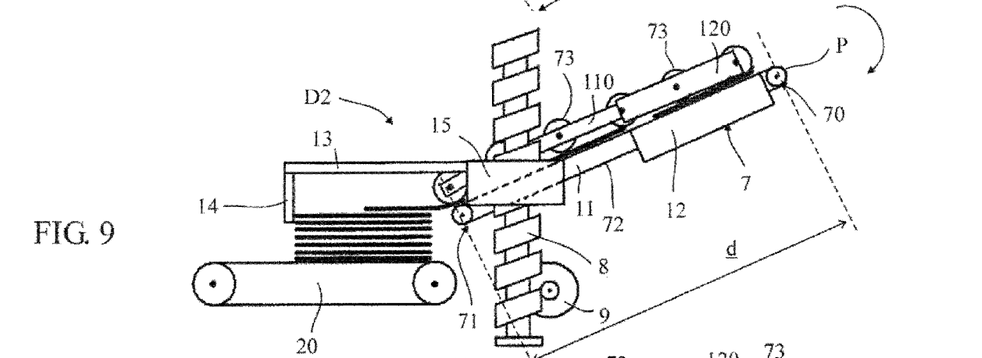
Figure 10:
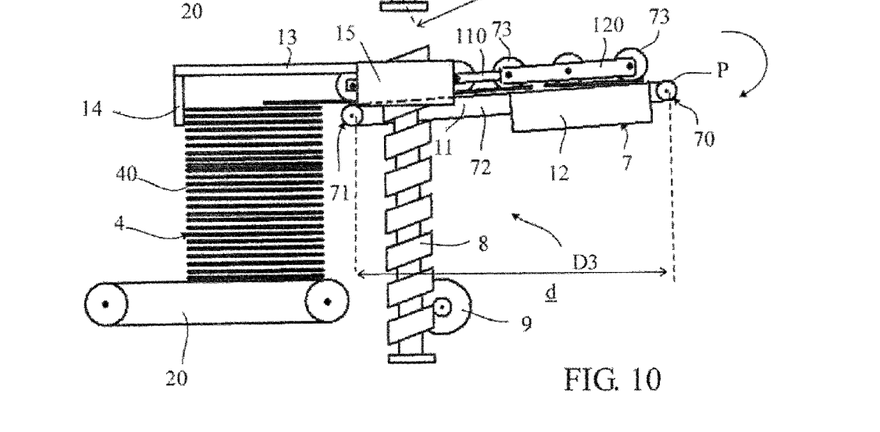

In the illustrated example, and as shown in FIGS. 8 to 10, the second end 71 moves vertically by means of a mobile carriage 15 with which it is coupled, for example along a vertical endless screw 8 driven in rotation in a fixed frame 80 by a motor 9. Of course, other driving means (drivers) arranged to control the vertical movement of the movable end 71, such as in particular one or several jacks, a timing belt and pulleys, chain and chain wheel, etc., transmission can be considered. In this type of transmission, the timing belt or the chain is attached to the mobile carriage, which is guided in vertical translation in said fixed frame 80.

Moreover, said first and second ends 70, 71 of the unloading conveyor 7 are mounted respectively on two distinct supporting structures 11 and 12, each supporting structure 11 and 12 including its own parallel belts 72 with fixed and invariable lengths. As shown in FIGS. 8 to 10 and 12, the supporting structure 11 is connected to the supporting structure 12 through a sliding connection parallel to the plane of said unloading conveyor 7 in order to create a telescopic unloading conveyor 7. Therefore, the distance d, comprised between the fixed axis P and the second end 71, varies advantageously as said second end 71 moves vertically, this variation being automatic, without affecting the length of the belts 72, which remains invariable. Therefore, no additional belt tensioning mechanism is to be provided. Of course, this variation can be assisted by any suitable means and controlled by the driving means (driver) of the mobile end 71. It is moreover possible to provide the same construction for the guide rollers 73. These are also mounted on two distinct supporting structures 110, 120, which are assembled through a sliding connection parallel to the plane of said unloading conveyor 7 (FIGS. 8 to 10).

With such configuration of the stacking device 10 according to the invention, at the beginning of a stacking cycle, the mobile end 71 of the unloading conveyor 7 is at its low position, in which it ends substantially at the height of the plane of the stacking table 20 (see FIGS. 5 and 8), so that the sheet 41 that will form the base of a sheet stack 40 can be laid down there. As the sheet 41 are stacked, the movable end 71 is moved vertically upwards, making the whole unloading conveyor 7 pivot about the axis P in the clockwise direction, in order to follow the progression of the stack of sheets 40 that is being formed (see FIGS. 6 and 9), until reaching the high position it occupies when the stack of sheets 40 is completely formed. Depending on the case, the unloading conveyor 7 is then located or not in a substantially horizontal plane, as represented in FIG. 10, which corresponds substantially to the maximum high point of the unloading conveyor 7.

The completion of the formation of a sheet stack 4, detected by a detector, for example, by means for counting (counter) A the number of sheets 40 or means for reading (reader), B optical marks printed on the sheets 40 or any other similar means, then triggers the transfer of the sheet stack 4 from the stacking table 20 to the evacuation conveyor 5. Since the stacking table 20 is located in the same plane as the evacuation conveyor 5, this transfer is performed very quickly, and the downtime of the cutter 6 between two sheet 40 stacking cycles is consequently advantageously limited to the time required by the movement of the movable end 71 of the unloading conveyor 7 to return to its low position, making the whole unloading conveyor 7 pivot about the axis P in the counter-clockwise direction.

In the illustrated embodiment variant, the unloading conveyor 7 is in addition long enough to be able to transport simultaneously the sheet 40 of several successive stacks 4. Such configuration allows advantageously the cutter 6 to continue operating while the unloading conveyor 7 returns to its low position in order to start a new stacking cycle, and consequently to save again significant time with respect to the stacking device 1 of the prior art.

According to another advantageous characteristic of the invention, the mobile carriage 15 is also coupled to a guiding element 13 including preferably a stop 14 arranged to position properly the sheet 40 on the stacking table 20 and allow forming homogeneous sheet stacks 4. Such a stop 14 can for example include a comb (not represented) whose teeth are arranged, if necessary, to pass between the belts of the evacuation conveyor 5 and/or of the stacking table 20 when the movable end 71 is located at its low position. In this case, a vertical translation movement of the mobile carriage 15 allows bringing the comb to a higher position, where it does not block any more the passage of a sheet stack 4 and allows evacuating it. According to another embodiment variant of the invention, a retractable comb can be provided to achieve this same goal. Moreover, the guiding element 13 is advantageously completed with a conveying device 16 as shown in FIG. 4 in the form of parallel belts, to accompany the sheets 40 up to the stop 14.

In addition, according to an additional characteristic of the invention, the guiding element 13 is advantageously arranged to adapt its depth to the format of the stacked sheets 40 and includes to that purpose size adjusting means (not represented). Such configuration allows in certain cases optimizing notably the time required for evacuating a sheet stack 4. When the format of the sheet 40 is smaller than the length of the stacking conveyor 20, several sheet stacks 4 already formed can be stored one behind the other on said stacking conveyor 20 before they are evacuated by only one translation movement of the stacking conveyor 20 towards the evacuation conveyor 5. This is particularly advantageous with respect to the stacking devices of the prior art, in which the evacuation of the sheet stacks 4 takes place stack by stack and requires consequently as many movements of the stacking conveyor 20 as there are sheet stacks 4 formed from one row 41.

Figure 11:
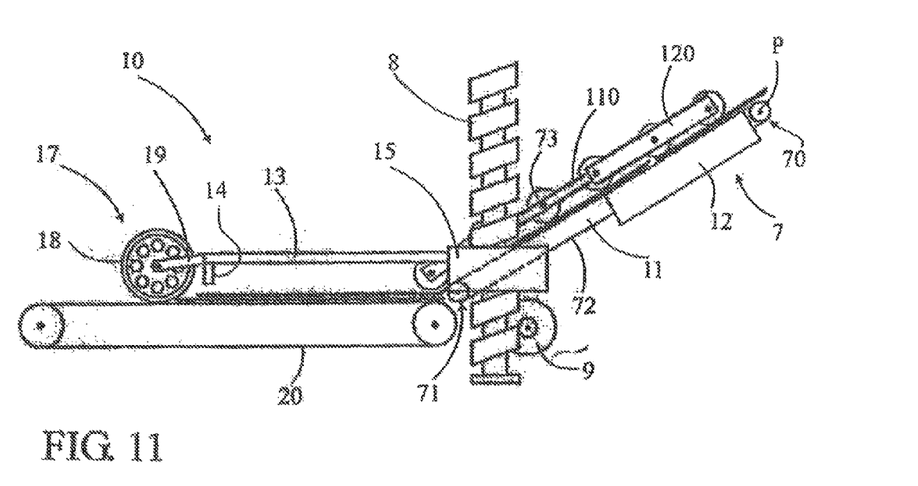
FIG. 11 represents a side view of the stacking device according to the invention equipped with a stepped sheet accumulation kit.
Figure 12:
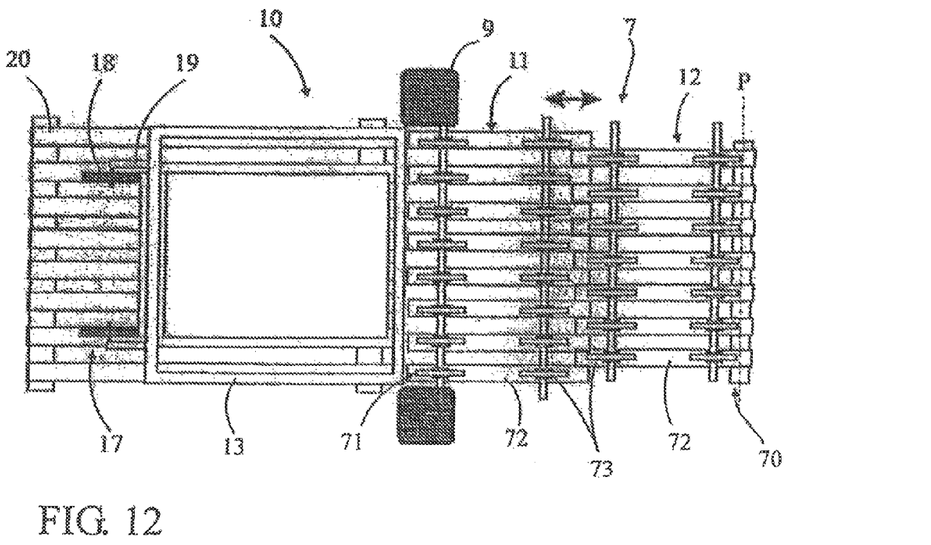
FIG. 12 is a top view of the stacking device of FIG. 11.

Finally, the stacking device 10 according to the invention can easily and quickly be equipped with a transformation kit 17 to switch over to the "stepped stacking" mode intended for processing sheet 40 formats that are longer than allowed by the stacking capacity of said device. This modification is made possible without important modification of the device, thanks to the fact that the sheets 40 are transported directly through the unloading conveyor 7 on the stacking table 20, which is located at the same level as the evacuation conveyor 5. As stated previously, the stacking table 20 and the evacuation conveyor 5 can form one single conveyor. In the presented example, this transformation kit 17 includes two idle wheels 18 mounted on a same axis carried by an arm 19 articulated about the free end of the guiding element 13, so that these wheels 18 are in elastic contact with the conveyor of the stacking table 20 and form a vertically movable stop. In this operating mode, the second end 71 of the unloading conveyor 7 is located at its low position, at the level of the stacking table 20, so as to allow the accumulation of the sheets 40 in stepped mode while guiding them thanks to the guiding element 13 carried by the movable carriage 15. The stop 14 is retracted so as to allow the sheets 40, placed one after the other on the stacking table 20 by the unloading conveyor 7, to advance up to the wheels 18 driven in rotation by the conveyor of the stacking table 20. In parallel, the conveyor of the stacking table 20 and the evacuation conveyor 5 move at a speed equal to a constant fraction of the speed of the cutter 6 and of the unloading conveyor 7. Each sheet 40 that arrives in contact with the wheels 18 is slowed down by these wheels 18 that exert a slight pressure on the conveyor, and then passes under the wheels 18. The advance speed of every sheet 40 and the overlapping ratio by the following sheet 40 are determined by the advance speed of the conveyor and of the stacking table 20. The wheels 18 can be replaced with a roller that extends over the whole width of the sheet 40 or by a plurality of parallel wheels 18.

POSSIBILITIES FOR INDUSTRIAL APPLICATION

This description shows clearly that the invention allows reaching the goals defined, that is to say offer a stacking device 10 for sheet 40 of paper or similar allowing to reduce to a minimum the downtimes of the cutter 6 in order to preserve the overall productivity of the sheets 40 cutting line.

In fact, thanks to the invention, the downtime of the cutter 6 during the evacuation of a completed sheet stack 4 is reduced to a part only of the time required for the movement of the mobile end 71 of the unloading conveyor 7 to return to its low position, this stroke being limited to the height of the stacks. Yet, due to the simplicity of its structure, the unloading conveyor 7 is particularly light since it does not carry the sheet stacks and moves very quickly with a low-power driving means (driver). Moreover, in compliance with the invention, only the fixed stacking table 20 bears the weight of the formed sheet stacks 4, which allows doing without complex, expansive and tedious to maintain actuating means for the stacking device 10.

In addition, this invention allows at a lower cost to transform the operating mode from a "stack stacking" mode to a "stepped stacking" mode for sheet formats larger than the capacity of the stacking head 20.

The present invention is not restricted to the example of embodiment described, but extends to any modification and variant which is obvious to a person skilled in the art while remaining within the scope of the protection defined in the attached claims.

The invention claimed is:

1. A stacking device (10), for stacking sheets (40) of paper or similar items arranged to form stacks (4) downstream of a sheet cutting line, the stacking device (10) comprising:
    a cutter outfeed conveyor (3) arranged to bring the sheets (40) cut by the cutter (6), one by one, towards a stacking table (20) arranged to communicate with a stack evacuation conveyor (5) located below the cutter outfeed conveyor (3) so that, once the stack is formed, at least one complete stack (4) of sheets (40) can be transferred from the stacking table (20) to the stack evacuation conveyor (5),
    the stacking table (20) being fixed and located in a same plane as the stack evacuation conveyor (5) and the stacking device (10) including an unloading conveyor (7) comprising a first end (70) communicating with the cutting outfeed conveyor (3) and a second end (71) communicating with the stacking table (20),
    the unloading conveyor (7) being arranged to transfer the sheets (40), one by one, from the cutter outfeed conveyor (3) towards the stacking table (20) and being coupled with a driver arranged to move the second end (71) between a low position in which, when the first sheet of a stack (4) is conveyed, the second end (71) is located at the level of the stacking table (20) and a high position in which, when the last sheet of the stack (4) is conveyed, the second end (71) is located at a height corresponding to that of the complete stack (4),
    wherein the first end (70) of the unloading conveyor (7) is mounted on a second supporting structure (12) while the second end (71) of the unloading conveyor (7) is mounted on a first supporting structure (11), each of the first and the second supporting structures (11, 12) comprises at least one belt (72), and each belt (72) of the first and the second supporting structures (11, 12) extends parallel to one another and has a fixed and invariable length, the second supporting structure (12) of the first end (70) is assembled with the first supporting structure (11) of the second end (71), by a sliding connection parallel to the plane of the unloading conveyor (7), in order to create a telescopic unloading conveyor (7) for adjusting the relative spacing of the first end (70) and the second end (71).

2. The stacking device (10) according to claim 1, wherein the first end (70) is articulated about a fixed horizontal axis (P), parallel to the stacking table (20), while the second end (71) is movable, in vertical translation, between the low and high positions of the unloading conveyor (7), and
    the unloading conveyor (7) is arranged so that a distance (d) between the fixed axis (P) and the second movable end (71) varies as the second end (71) moves vertically due to a relative sliding displacement of the first and the second supporting structures (11, 12) of the unloading conveyor (7).

3. The stacking device (10) according to claim 2, wherein the driver include at least one actuator coupled of a mechanical transmission with a mobile carriage (15) connected to the second end (71) of the unloading conveyor (7).

4. The stacking device (10) according to claim 3, wherein the mechanical transmission includes at least one vertical endless screw (8) guided in rotation in a fixed frame (80) and engaging the mobile carriage (15) guided along the endless screw (8).

5. The stacking device (10) according to claim 3, wherein the mobile carriage (15) is also coupled with a guiding element (13) which comprises a translation stopper (14) that allow formation of a homogeneous sheet stacks (4).

6. The stacking device (10) according to claim 5, wherein the guiding element (13) includes a conveyor associated with a stop (14) for properly positioning the sheets (40) of the stack (4) on the stacking table (20).

7. The stacking device (10) according to claim 1, wherein the stacking device (10) comprises a detector for detecting formation of a complete stack (4, A, B).

8. The stacking device (10) according to claim 7, wherein the detector for detecting the formation of the complete stack (4) include a counter for counting the number of sheets (A).

9. The stacking device (10) according to claim 7, wherein the device for detecting the formation of a complete stack (4) include a reader for reading optical marks printed on the sheets (B).

10. The stacking device (10) according to claim 1, wherein each of the first and the second supporting structure (11, 12) of the unloading conveyor (7) comprises a plurality of belts (72) topped by a plurality of aligned guide rollers (73).

11. The stacking device (10) according to claim 1, wherein the unloading conveyor (7) has a length which allows the unloading conveyor (7) to transport simultaneously several sheets (40) intended to be conveyed one after the other to form a same stack (4) or several successive stacks (4).

12. The stacking device (10) according to claim 1, wherein the unloading conveyor (7) has a width which allows the unloading conveyor (7) to transport simultaneously several sheets (40) intended to be conveyed simultaneously beside each other to form simultaneously several stacks (4).

13. The stacking device (10) according to claim 1, wherein the stacking device (10) comprises a transformation kit (17) for switching over to a "stepped stacking" mode including at least one idle wheel (18) mounted on an axis carried by an arm (19) articulated about a free end of a guiding element (13) so that the wheel (18) is in elastic contact with the conveyor of the stacking table (20) and forms a vertically movable stop.

14. A device (10), for stacking sheets (40) of sheets arranged to form a stack (4) downstream of a sheet cutting line, the stacking device (10) comprising:
- a cutter outfeed conveyor (3) arranged to pass the sheets (40) cut by the cutter (6), one by one, towards a stacking table (20) communicating with a stack evacuation conveyor (5) located below the cutter outfeed conveyor (3) so that, once the stack is formed, at least one complete stack (4) of sheets (40) can be transferred from the stacking table (20) to the stack evacuation conveyor (5),
- the stacking table (20) being fixed and located in a same plane as the stack evacuation conveyor (5) and the stacking device (10) including an unloading conveyor (7) comprising a first end (70) and a second end (71) that respectively communicate with the cutting outfeed conveyor (3) and the stacking table (20),
- the unloading conveyor (7) being arranged to transfer the sheets (40), one by one, from the cutter outfeed conveyor (3) towards the stacking table (20) and being coupled with driving mechanism arranged to move the second end (71) between a low position in which, when the first sheet of the stack (4) is conveyed, the second end (71) is located at the level closely adjacent the stacking table (20) and a high position in which, when a last sheet of the stack (4) is conveyed, the second end (71) is located closely adjacent a height corresponding to that of the complete stack (4),
- wherein the first end (70) of the unloading conveyor (7) is mounted on at a second supporting structure (12) while the second end (71) of the unloading conveyor (7) is mounted on a first supporting structure (11), each of the first and the second supporting structures (11, 12) comprises a plurality of belts (72), and each belt (72) of the first and the second supporting structures (11, 12) extends parallel to one another and has a fixed and invariable length, the second supporting structure (12) of the first end (70) is assembled with the first supporting structure (11) of the second end (71) by a sliding connection which is parallel to the plane of the unloading conveyor (7 in order to create a telescopic unloading conveyor (7) for adjusting the relative spacing of the first end (70) and the second end (71).

15. A stacking device (10), for stacking sheets (40) of paper or similar items arranged to form stacks (4) downstream of a sheet cutting line, the stacking device (10) comprising:
- a cutter outfeed conveyor (3) arranged to bring the sheets (40) cut by the cutter (6), one by one, towards a stacking table (20) arranged to communicate with a stack evacuation conveyor (5) located below the cutter outfeed conveyor (3) so that, once the stack is formed, at least one complete stack (4) of sheets (40) can be transferred from the stacking table (20) to the stack evacuation conveyor (5),
- the stacking table (20) being fixed and located in a same plane as the stack evacuation conveyor (5) and the stacking device (10) including an unloading conveyor (7) comprising a first end (70) communicating with the cutting outfeed conveyor (3) and a second end (71) communicating with the stacking table (20),
- the unloading conveyor (7) being arranged to transfer the sheets (40), one by one, from the cutter outfeed conveyor (3) towards the stacking table (20) and being coupled with a driver arranged to move the second end (71) between a low position in which, when the first sheet of a stack (4) is conveyed, the second end (71) is located at the level of the stacking table (20) and a high position in which, when the last sheet of the stack (4) is conveyed, the second end (71) is located at a height corresponding to that of the complete stack (4),
- wherein the first end (70) of the unloading conveyor (7) is mounted on a second supporting structure (12) while the second end (71) of the unloading conveyor (7) is on a first supporting structure (11), each of the first and the second supporting structures (11, 12) comprises a plurality of spaced apart parallel belts (72), and each of the plurality of parallel belt (72) of the first and the second supporting structures (11, 12) having a fixed and constant length, the second supporting structure (12) of the first end (70) is assembled with the first supporting structure (11) of the second end (71), by a sliding connection, so that the first end (70) and the second end (71) are movable relative to one another, parallel to the plane of the unloading conveyor (7), in order to create a telescopic unloading conveyor (7) for adjusting the relative spacing of the first end (70) and the second end (71) with respect to one another and adjust a length of the unloading conveyor (7).

\* \* \* \* \*